(12) United States Patent
Kim

(10) Patent No.: US 9,861,252 B2
(45) Date of Patent: *Jan. 9, 2018

(54) DISHWASHER

(71) Applicant: Samsung Electronics Co., Ltd, Gyeonggi-do (KR)

(72) Inventor: Jin-doo Kim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 88 days.

This patent is subject to a terminal disclaimer.

(21) Appl. No.: 14/818,210

(22) Filed: Aug. 4, 2015

(65) Prior Publication Data

US 2016/0029872 A1 Feb. 4, 2016

(30) Foreign Application Priority Data

Aug. 4, 2014 (KR) ........................ 10-2014-0099961

(51) Int. Cl.
*A47L 19/02* (2006.01)
*A47L 15/42* (2006.01)
*F16J 15/02* (2006.01)
*F16J 15/06* (2006.01)

(52) U.S. Cl.
CPC ....... *A47L 15/4225* (2013.01); *A47L 15/4259* (2013.01); *A47L 15/4263* (2013.01); *F16J 15/025* (2013.01); *F16J 15/061* (2013.01)

(58) Field of Classification Search
CPC ................................................ A47B 88/0414
USPC ....... 312/228, 326–329, 319.5, 319.6, 319.7, 312/319.8

See application file for complete search history.

(56) References Cited

U.S. PATENT DOCUMENTS

| 8,882,933 | B2 * | 11/2014 | Assmann et al. ... | A47L 15/4259 134/57 DL |
| 2011/0016907 | A1 * | 1/2011 | Kang ................... | F25D 23/028 62/449 |
| 2013/0057134 | A1 * | 3/2013 | Kilic .................. | A47L 15/0034 312/319.8 |
| 2014/0132135 | A1 * | 5/2014 | Becchi ............... | A47L 15/4259 312/228 |
| 2015/0108885 | A1 * | 4/2015 | Kang ................. | A47L 15/4259 312/228 |

FOREIGN PATENT DOCUMENTS

EP 2591712 A1 5/2013

* cited by examiner

*Primary Examiner* — Matthew W Ing

(57) ABSTRACT

A dishwasher is provided. The dishwasher includes a main body including a washing chamber and an input port for inputting dishes into the washing chamber; a door configured to hinge-connect at one end to the main body and open and close the washing chamber; and a door opening apparatus installed in the main body configured to open the door, wherein the door opening apparatus includes a thermally driven actuator configured to thermally expand and contract to make a plunger protrude, a movable member configured to linearly reciprocate when supplied with power from the thermally driven actuator, and a push portion configured to push the door so as to open the input port when supplied with power form the movable member.

9 Claims, 13 Drawing Sheets

DISHWASHER

CROSS-REFERENCE TO RELATED APPLICATION AND CLAIM OF PRIORITY

The present application is related to and claims benefit from Korean Patent Application No. 10-2014-0099961, filed on Aug. 4, 2014, in the Korean Intellectual Property Office, the disclosure of which is incorporated herein by reference in its entirety.

TECHNICAL FIELD

The present disclosure relates to a dishwasher, and more particularly, to a dishwasher including a door opening apparatus which automatically opens a door in order to discharge steam in a washing chamber to outside of a main body of the dishwasher after washing is completed and a substrate fixing structure that fixes a printed circuit board to an inner side of the door.

BACKGROUND

Generally, a dishwasher includes a main body having an input port for inputting dishes formed on a front surface thereof, a washing chamber provided at an inner side of the input port, and a door opening and closing the input port, in which the washing chamber is configured to include a rack for receiving dishes, upper and lower nozzles jetting water to the dishes received in the rack to wash dirty dishes, etc.

The existing dishwasher includes a door opening apparatus. To open a door after the washing is completed to discharge steam in the washing chamber to outside of the main body through the input port, the door opening apparatus opens the door as much as a predetermined angle to form a gap between the door and the input port.

In certain embodiments, after the door is opened, power applied to the dishwasher is automatically cut off. The existing dishwasher is provided with a separate return spring to return a push rod of the door opening apparatus pushing the door to an original position after power is cut off. However, in the case in which the dishwasher includes the separate return spring, an assembling process of installing the return spring needs to be added and as a result, manufacturing costs may be increased, and the return spring is deformed at the time of long-term use and as a result, operation failures may occur.

Further, in the existing dishwasher, a printed circuit board is disposed at an inner side of the door to control buttons disposed on a front surface of the door or light emitting lamps for displaying a state.

To fix the printed circuit board to the inner side of the door, a board guide supporting the printed circuit board is formed, and then the printed circuit board is fixed to the board guide by a fastening screw.

However, the existing dishwasher needs to use the fastening screw, which provides a cause of an increase in product costs due to an addition of parts, an increase in the number of assembling processes, and an increase in an assembling fault rate.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

To address the above-discussed deficiencies, it is a primary object to provide a dishwasher capable of preventing an increase in product costs by removing separate parts for originally returning a push rod of a door opening apparatus.

The present disclosure provides a dishwasher having a substrate fixing structure capable of rapidly and firmly fixing a printed circuit board to an inner side of a door without a separate fastening screw.

According to an aspect of the present disclosure, a dishwasher includes: a main body including a washing chamber and an input port for inputting dishes into the washing chamber; a door configured to hinge-connect at one end to the main body and open and close the washing chamber; and a door opening apparatus installed in the main body configured to open the door, wherein the door opening apparatus includes a thermally driven actuator configured to thermally expand and contract to make a plunger protrude, a movable member configured to linearly reciprocate when supplied with power from the thermally driven actuator, and a push portion configured to push the door so as to open the input port when supplied with power form the movable member.

The plunger is connected to a part of the movable member.

The dishwasher further includes: an elastic member configured to connect between the thermally driven actuator and the movable member.

The elastic member is formed of a coil spring and one end of the elastic member is connected to the plunger of the actuator and the other end thereof is connected to a part of the movable member.

The dishwasher further includes: a fastener configured to be separably connected to the plunger of the thermally driven actuator; and an elastic member configured to have one end separably connected to the fastener and the other end connected to the movable member.

The elastic member is formed of a coil spring and the fastener is provided with a spiral groove with which one end of the coil spring is fastened by a screw-connection manner.

The push portion includes: at least one connecting rod configured to be hinge-connected to a front end of the movable member; and at least one push rod configured to be hinge-connected to the at least one connecting rod and press the door.

The door opening apparatus includes: a lower case configured to have the thermally driven actuator, the movable member, and the push portion installed therein and have an upper part opened; and an upper case configured to be separably coupled with the lower case to close the upper part of the lower case, a center of the one connecting rod is hinge-connected to the lower case.

The dishwasher further includes: a substrate fixing structure configured to protrude toward an inner side of an upper part of the door to hold a printed circuit board.

The substrate fixing structure is integrally firmed with the upper part of the door.

The substrate fixing structure includes: at least one fixed rib configured to fix a first side end of the printed circuit board; an elastic support portion configured to elastically support a bottom surface of a second side end corresponding to the first side end of the printed circuit board; a first hook portion configured to fix a third side end between the first and second side ends of the printed circuit board; and a second hook portion configured to fix a fourth side end corresponding to the third side end of the printed circuit board.

The elastic support portion may have a curved shape.

The elastic support portion may have one end fixed to the first hook portion and the other end fixed to the upper part of the door.

The at least one fixed rib is provided with a fixed groove into which the first side end of the printed circuit board is inserted.

According to another aspect of the present disclosure, a dishwasher includes: a main body configured to be provided with a washing chamber; a door configured to be hinge-connected to the main body and opening and closing the washing chamber; a door opening apparatus configured to include a thermally driven actuator including a plunger, a movable member moving forward and backward while interlocking with the thermally driven actuator, and a push portion opening the door white interlocking with the movable member; and a substrate fixing structure configured to be injection-molded at a part of the door.

Additional and/or other aspects and advantages of the disclosure will be set forth in part in the description which follows and, in part, will be obvious from the description, or is learned by practice of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system. The present disclosure will be more apparent by describing in detail exemplary embodiments of the present disclosure with reference to the accompanying drawings. Further, to help understanding of the present disclosure, the accompanying drawings are not necessarily illustrated to scale but dimensions of some components may be illustrated to be exaggerated.

Hereinafter, a dishwasher according to an exemplary embodiment of the present disclosure will be described in detail with reference to the accompanying drawings. The dishwasher according to the exemplary embodiment of the present disclosure is applied to a built-in type which is used while embedded between furniture or a wall or a standing type which is not built-in.

Figure 1:
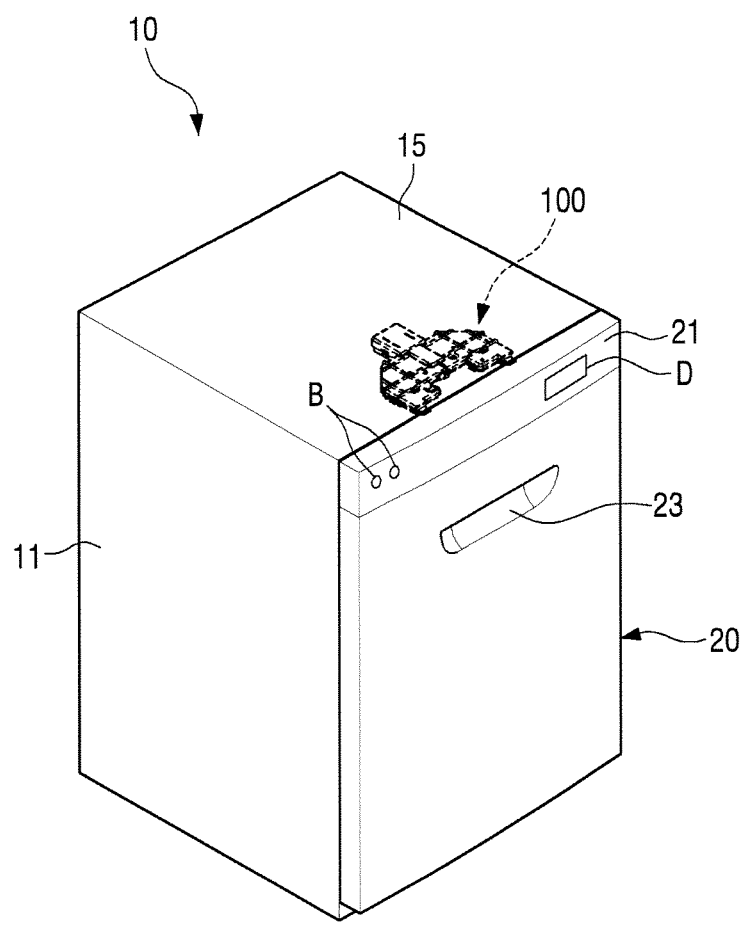
FIG. 1 illustrates a dishwasher according to various embodiments of the present disclosure.
Figure 2:
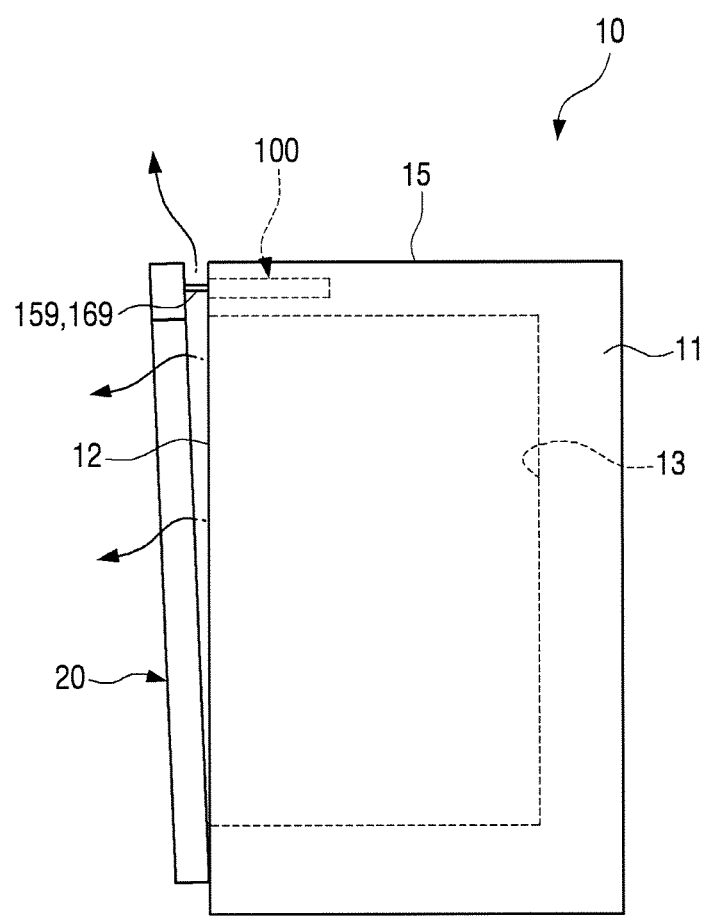
FIG. 2 illustrates a state in which a door opening apparatus illustrated in FIG. 1 opens a door to discharge steam in a washing chamber according to various embodiments of the present disclosure.

Referring to FIGS. 1 and 2, a dishwasher 10 according to an exemplary embodiment of the present disclosure includes a main body 11, a door 20, a door opening apparatus 100, and a substrate fixing structure 200 for fixing a printed circuit board.

An inner side of the main body 11 is provided with a washing chamber 13 having a predetermined size and a front thereof is provided with an input port 12 for inputting dishes (not illustrated) to the washing chamber 13.

An inner side of the washing chamber 13 is provided with at least one nozzle (not illustrated) jetting washing water toward dishes received in the washing chamber 13 and an inner wall of the washing chamber 13 is provided with a guide rail (not illustrated) for guiding a rack (not illustrated) in which the dishes are received.

Further, the door opening apparatus 100 is embedded in an upper part 15 of the main body 11. In certain embodiments, a front end of the door opening apparatus 100 is disposed to be adjacent to the input port 12 so that the door opening apparatus 100 opens the door 20.

A lower end of the door 20 is hinge-connected to the main body 11 to open and close the input port 12 of the washing chamber 13. In certain embodiments, an outer side of the door 20 is provided with a groove 23 for handle, and thus a user manually opens the door 20.

Further, the substrate fixing structure 200 is integrally formed at an upper part 211 of the door 20 to support the printed circuit board 50 to an inner side of the upper part 21 of the door 20. The printed circuit board 50 controls a button B which is disposed on a front surface of the door 20 or a display unit D which displays an operating state of the dishwasher.

Hereinafter, a structure of the door opening apparatus 100 will be described in detail with reference to FIGS. 3 to 6. To instantaneously discharge steam in the washing chamber to an outside of the main body 11 after the washing is completed so as to keep an inside of the washing chamber in a dried state, the door opening apparatus 100 automatically opens the door 20 as much as a predetermined angle and return first and second push rods 156 and 166 to be described below to original positions in a state in which power applied to the door opening apparatus 100 is cut off.

Figure 3:
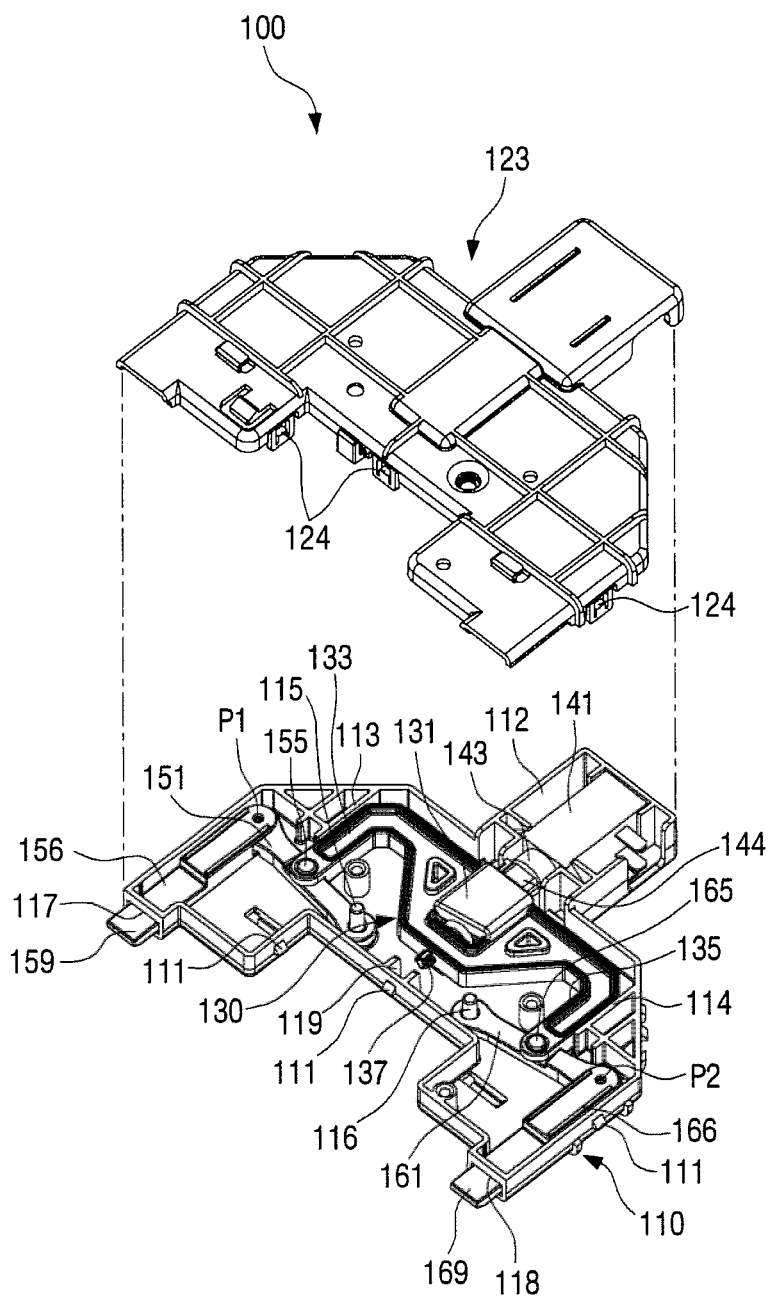
FIG. 3 illustrates a state in which an upper case of the door opening apparatus illustrated in FIG. 1 is separated from a lower case according to various embodiments of the present disclosure.
Figure 4:
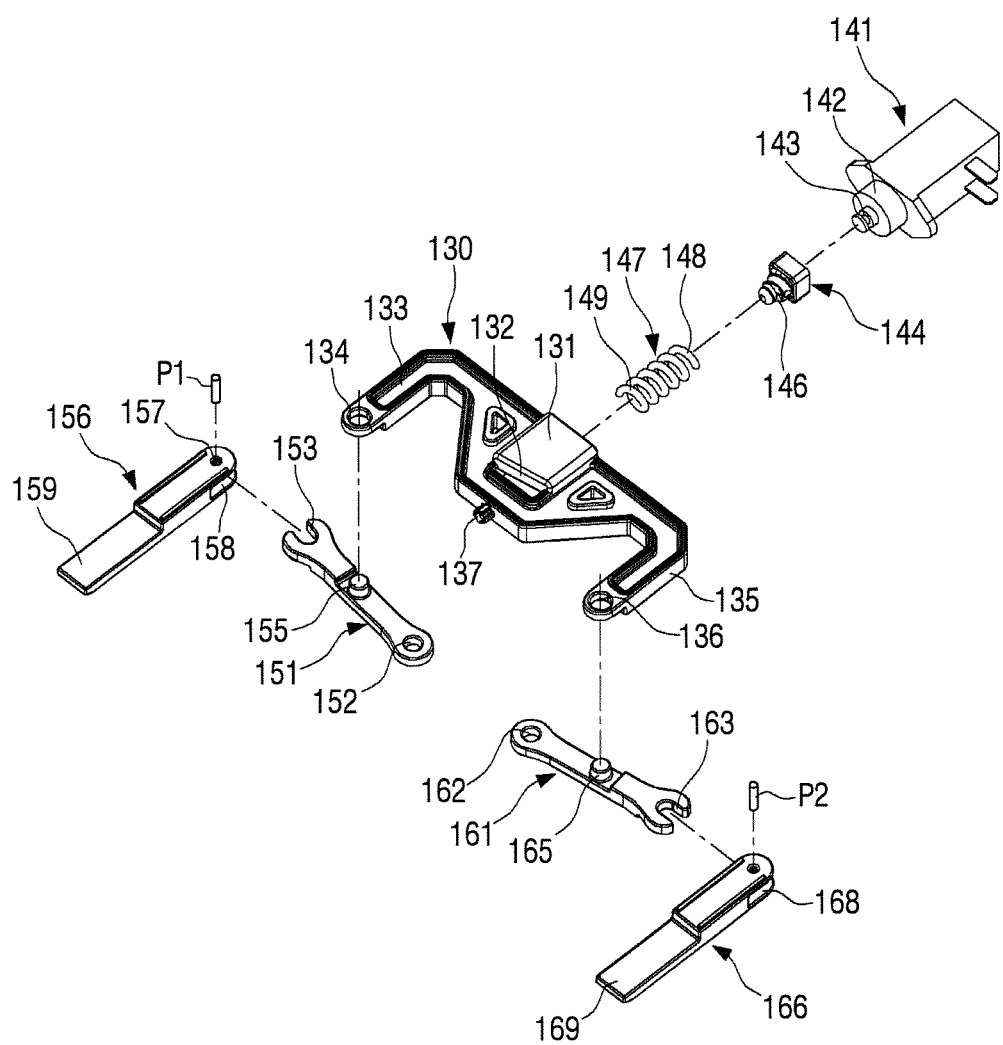
FIG. 4 illustrates an actuator and driving parts of the door opening apparatus according to various embodiments of the present disclosure.

Referring to FIG. 3, the door opening apparatus 100 includes a lower case 110, an upper case 123, a movable member 133, a thermally driven actuator 141, a fastener 144, an elastic member 147, and a push portion. In certain embodiments, as illustrated in FIG. 4, the push portion includes first and second connecting rods 151 and 161, and the first and second push rods 156 and 166.

The lower case 110 is provided with the movable member 130, the thermally driven actuator 141, the fastener 144, the elastic member 147, and the push portion.

An upper part of the lower case 110 is opened and a plurality of coupling protrusions 111 is protrudedly disposed along an edge of the lower case 110 at a predetermined interval. The plurality of coupling protrusions 111 are snap-connected to each of a plurality of coupling grooves 124 formed along an edge of the upper case 123 when the upper case 123 is coupled with the lower case 110 to close the upper part of the lower case 110.

A rear end of the lower case 110 is provided with an extension 112 into which the thermally driven actuator 141 is inserted.

The lower case 110 is provided with first and second guide walls 113 and 114 along front and rear ends of the lower case 110 to guide a linearly reciprocating movement of the movable member 130. In certain embodiments, the first and second guide walls 113 and 114 are disposed in parallel with each other.

The lower case 110 is provided with first and second hinge protrusions 115 and 116 with which the first and second connecting rods 151 and 161 are rotatably coupled and both sides of a front end of the lower case 110 are each provided with first and second guide holes 117 and 118 through which the first and second push rods 156 and 166 penetrate.

The lower case 110 is provided with a guide groove 119 for guiding a stopper 137 of the movable member 130. In certain embodiments, to open the door 20, the guide groove 119 guides the stopper 137 when the movable member 130 moves toward the door 20 side.

The upper case 123 is separably coupled with the lower case 110 and when the upper case 123 is coupled with the lower case 110, the upper part of the upper case 123 is closed, and thus the movable member 130, the thermally driven actuator 141, the fastener 144, the elastic member 147, and the push portion is protected.

Referring to FIG. 4, the thermally driven actuator 141 is driven by being supplied with power and is thermally expanded and contracted to generate power for linearly reciprocating the movable member 130. The thermally driven actuator 141 includes a plunger 142 which protrudes as much as a predetermined distance at the time of the thermal expansion and returns to an original position at the time of the thermal contraction.

A front end of the plunger 142 is protrudedly provided with the coupling portion 143 with which the fastener 144 is separably coupled.

Figure 5:
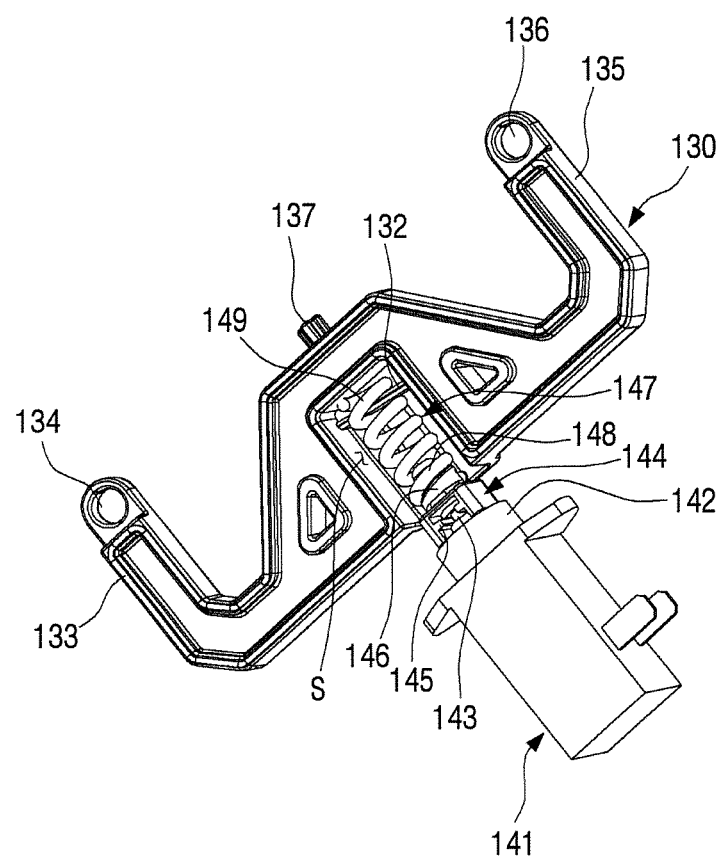
FIGS. 5 and 6 illustrate a connection structure between a thermally driven actuator and a movable member illustrated in FIG. 4 according to various embodiments of the present disclosure.
Figure 6:
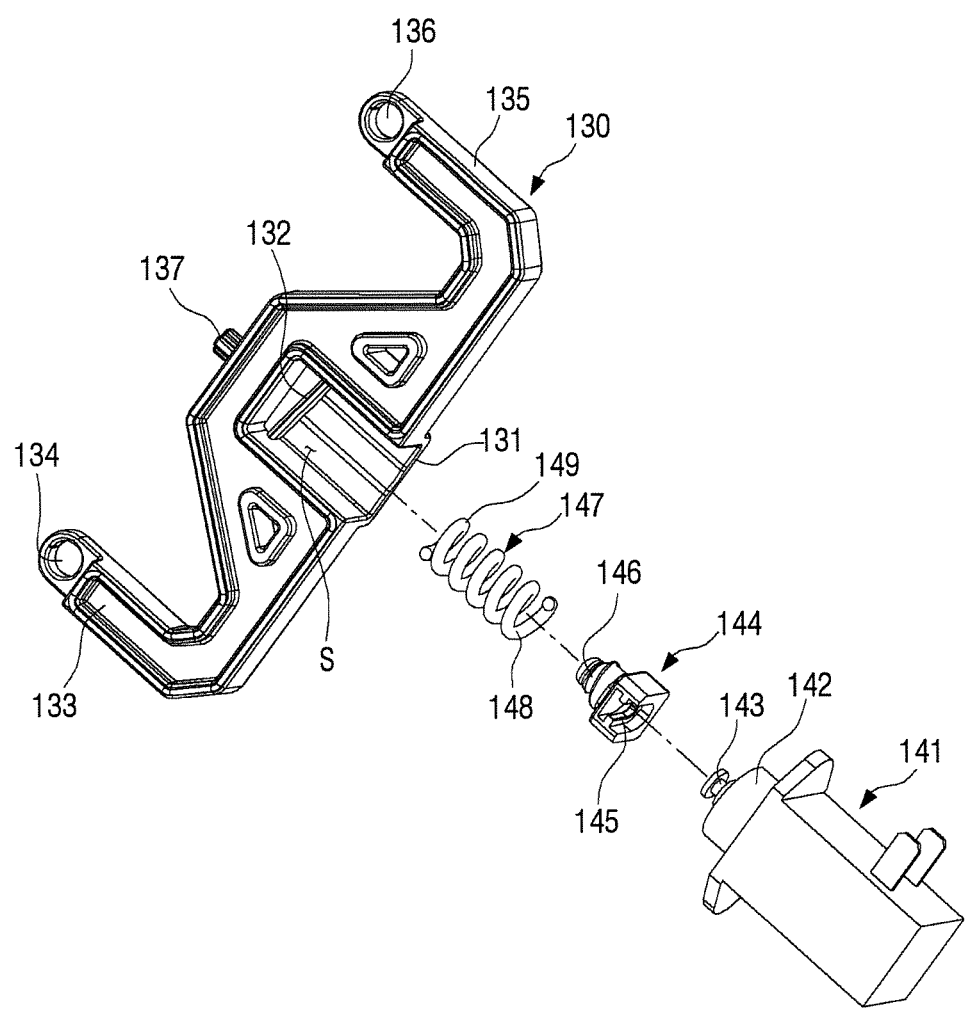

Referring to FIGS. 5 and 6, the fastener 144 connects the plunger 142 of the thermally driven actuator 141 to the elastic member 147.

To this end, the fastener 144 is protrudedly provided with a coupling rib 145 along an inner side of a rear end thereof. The coupling rib 145 is slidably coupled with the coupling portion 143 which is provided with a slit.

Further, the front end of the fastener 144 is provided with a spiral groove 146 with which a rear end 148 of the elastic member 147 is separably coupled by a screw-connection manner. A worker easily fastens the rear end 148 of the elastic member 147, which is a coil spring, with the fastener 144 through the spiral groove 146.

The elastic member 147 is formed of the coil spring and connects the fastener 144 to the movable member 130. The elastic member 147 buffers a stroke generated by a force delivered to the movable member 130 at the time of the driving of the thermally driven actuator 141 to slowly press the movable member 130. In certain embodiments, the elastic member 147 has an increased elastic force while being compressed by the driving force of the thermally driven actuator 141, and therefore the movable member 130 is pressed by a force larger than the driving force of the thermally driven actuator 141.

Further, as illustrated in FIG. 5, the elastic member 147 is separably fixed to the movable member 130 as a stumbling sill 132 of the movable member 130 is inserted into a front end 149.

The movable member 130 delivers the driving force of the thermally driven actuator 141 to the first and second push rods 156 and 166.

A center of the movable member 130 is provided with a space S into which the elastic member 147 is inserted and the movable member 130 is provided with a cover 131 covering the space S to prevent the elastic member 147 from being separated from the space S.

Both sides of the movable member 130 are provided with first and second arm portions 133 and 135 which protrude forward. The first and second arm portions 133 and 135 are funned to be symmetrical with each other and front ends thereof are each formed with hinge holes 134 and 136.

The first and second arm portions 133 and 135 are each guided by the first and second guide walls 113 and 114 of the lower case 110 so that the movable member 130 linearly reciprocates.

A center of a front end of the movable member 130 is provided with the stopper 137. The stopper 137 limits a distance moving of the movable member 130 toward the door 20 side by the thermally driven actuator 141.

As described above, the push portion includes the first and second connecting rods 151 and 161, and the first and second push rods 156 and 166.

Referring to FIGS. 3 and 4, the first connecting rod 151 connects the movable member 130 to the first push rod 156 so that the first push rod 156 interlocks with the movable member 130.

One end of the first connecting rod 151 is provided with a first coupling hole 152 to which a first hinge protrusion 115 of the lower case 110 is hinge-connected and the other end thereof is provided with a coupling groove 153 to which a rear end of the first push rod 156 is hinge-connected.

Further, a hinge protrusion 155 that is hinge-connected to the hinge hole 134 of the first arm portion 133 of the movable member 130 is formed at approximately a middle part of the first connecting rod 151. Therefore, the first connecting rod 151 moves the first push rod 156 forward and backward in a straight direction while pivoting around the first hinge protrusion 115 of the lower case 110 when the movable member 130 linearly reciprocates.

The rear end of the first push rod 156 is provided with a through hole 157 through which a hinge pin P1 penetrates. In certain embodiments, the rear end of the first push rod 156 is provided with a cutting groove 158 into which the first connecting rod 151 is movably inserted. In certain embodiments, the coupling groove 153 of the first connecting rod 151 inserted into the cutting groove 158 is hinge-connected to the hinge pin P1.

Further, a front end 159 of the first push rod 156 is inserted into the first guide hole 117 of the lower case 110. The front end 159 of the first push rod 156 directly pushes the door 20 to open the input port 12 so as to discharge the steam in the washing chamber 13 to the outside of the main body 11, thereby keeping the washing chamber 13 in the dried state.

The second connecting rod 161 and the second push rod 166 are disposed to be each symmetrical with the first connecting rod 151 and the first push rod 156 as described above.

One end of the second connecting rod 161 is provided with the second coupling hole 162 to which the second hinge protrusion 116 of the lower case 110 is hinge-connected, the other end thereof is provided with the coupling groove 163 which is hinge-connected to the rear end of the second push rod 156, and approximately a middle part of the second connecting rod 161 is provided with the hinge protrusion 165 which is hinge-connected to the hinge hole 136 of the second arm portion 135 of the movable member 130.

The rear end of the second push rod 166 is provided with a through hole 167 through which a hinge pin P2 penetrates and is provided with a cutting groove 168 into which the second connecting rod 161 is movably inserted. In certain embodiments, the coupling groove 163 of the second connecting rod 161 inserted into the cutting groove 168 is hinge-connected to the hinge pin P2.

Further, the front end 169 of the second push rod 166 is inserted into the second guide hole 118 of the lower case 110. The front end 169 of the second push rod 166 directly pushes the door 20 together with the first push rod 156 to open the input port 12.

Hereinafter, an operation of the door opening apparatus 100 will be described in detail with reference to FIGS. 7 to 8.

Figure 7:
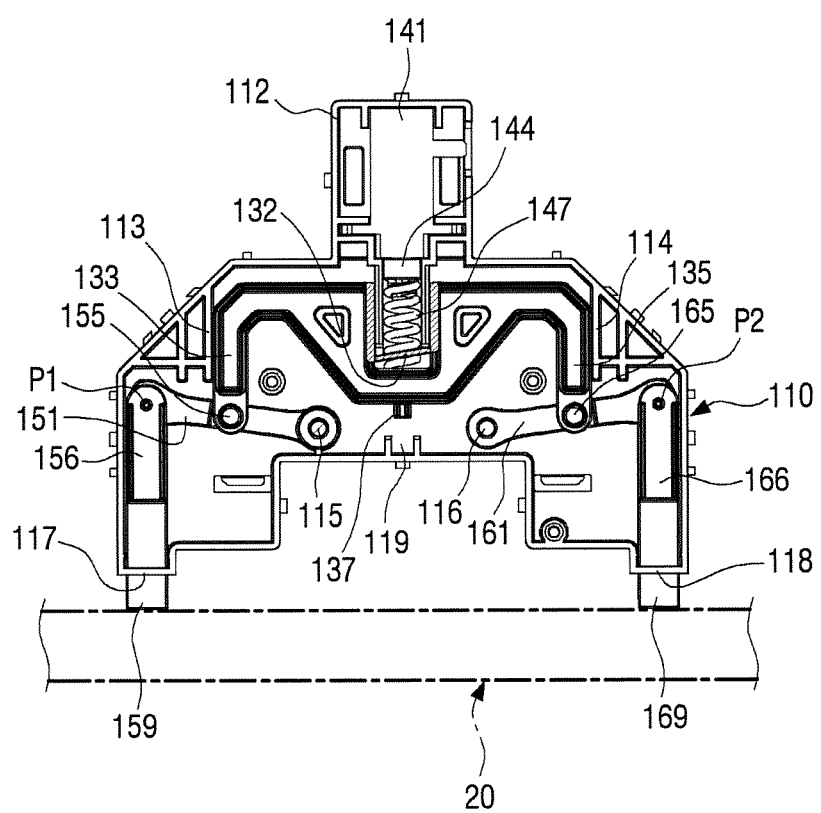
FIG. 7 illustrates the door opening apparatus in a state before the door of the dishwasher is opened as illustrated in FIG. 1 according to various embodiments of the present disclosure.

First, as illustrated in FIG. 1, when the door 20 closes the input port 12 of the main body 11, the first and second push rods 159 and 169 of the door opening apparatus 100 is set at a position where they do not push the door 20 as illustrated in FIG. 7.

Figure 8:
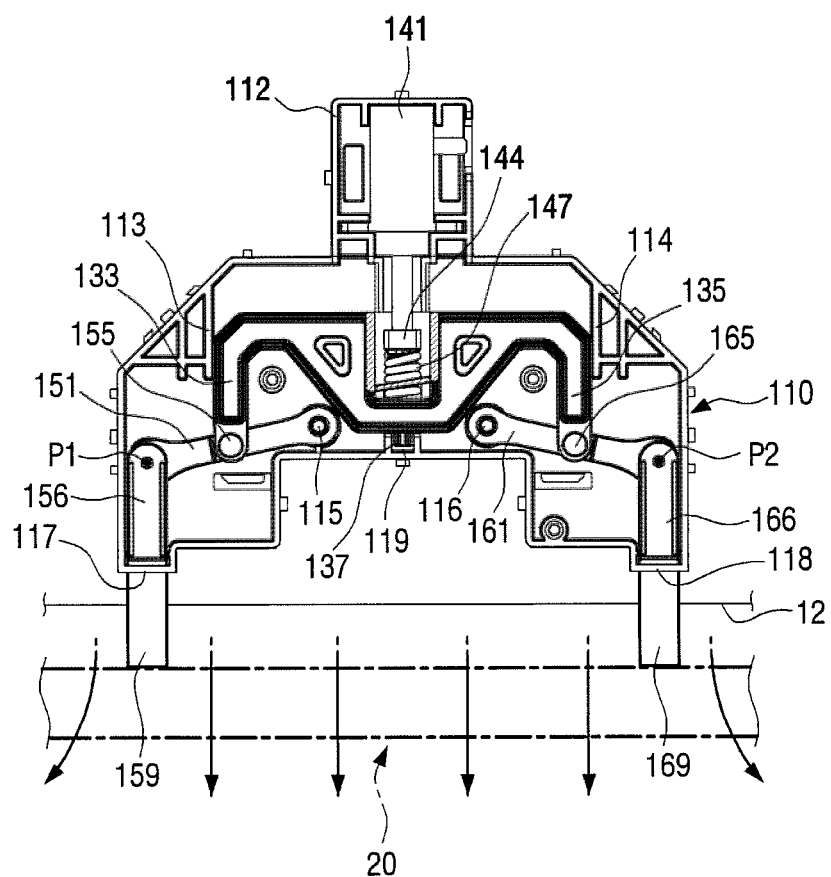
FIG. 8 illustrates the door opening apparatus in a state in which the door of the dishwasher is opened as illustrated in FIG. 2 according to various embodiments of the present disclosure.

Referring to FIG. 8, when the washing performed by the dishwasher 10 is completed, the thermally driven actuator 141 is driven. That is, the thermally driven actuator 141 is thermally expanded to protrude the plunger 142.

Therefore, the elastic member 147 is compressed by the fastener 144 moving together with the plunger 142 and then presses the movable member 130 toward the door 20 side.

The movable member 130 linearly moves toward the door 20 side, the first and second connecting rods 151 and 161 interlock with the movable member 130 so that the other ends of the first and second connecting rods 151 and 161, respectively, pivot around the first and second hinge protrusions 115 and 116 of the lower case 110 to be toward the door 20 side.

The first and second push rods 156 and 166 each interlock with the first and second hinge protrusions 115 and 116 to move toward the door 20 side and the front ends 159 and 169 of the first and second push rods 156 and 166 push the door 20 so that the door 20 rotates at a predetermined angle.

Therefore, as illustrated in FIG. 2, the door 20 rotates enough to form a gap from the input port 12 and the steam in the washing chamber 13 is discharged to the outside of the main body 11 through the gap.

As described above, when the opening of the door 20 for discharging the steam is completed, the power to the dishwasher 10 is cut off.

In certain embodiments, the thermally driven actuator 141 is thermally contracted over time and the plunger 142 returns to an original position. Therefore, the movable member 130, the first and second connecting rods 151 and 161, and the first and second push rods 156 and 166 move in an opposite direction to the progress direction at the time of the opening of the door 20 as described above and thus they all return to the original positions.

As described above, according to the exemplary embodiment of the present disclosure, the movable member 130 and the first and second push rods 156 and 166 naturally return to the original positions by the thermally driven actuator 141. Therefore, an additional member such as the separate return spring for returning the movable member 130 and the first and second push rods 156 and 166 to the original positions is omitted.

The exemplary embodiment of the present disclosure describes that the push portion is disposed at both sides inside the movable member 130, respectively, but is not limited thereto and the push portion is disposed at only any one of both sides inside the movable member 130. As described above, when the push portion is disposed only at any one of the movable members 130, the push portion is configured of one connecting rod and one push rod hinge-connected to the connecting rod.

Further, the exemplary embodiment of the present disclosure describes that the plunger 142 of the thermally driven actuator 141 is connected to the movable member 130 through the fastener 144 and the elastic member 147 but is not limited thereto. Therefore, the fastener 144 and the elastic member 147 are omitted and the coupling portion 143 of the plunger 142 is directly connected to the rear end of the movable member 130 or the fastener 144 is omitted and the coupling portion 143 of the plunger 142 is directly connected to the rear end 148 of the elastic member 147.

Hereinafter, the substrate fixing structure 200 which is formed at the inner side of the upper part 21 of the door 20 will be described with reference to FIGS. 9 to 13.

Figure 9:
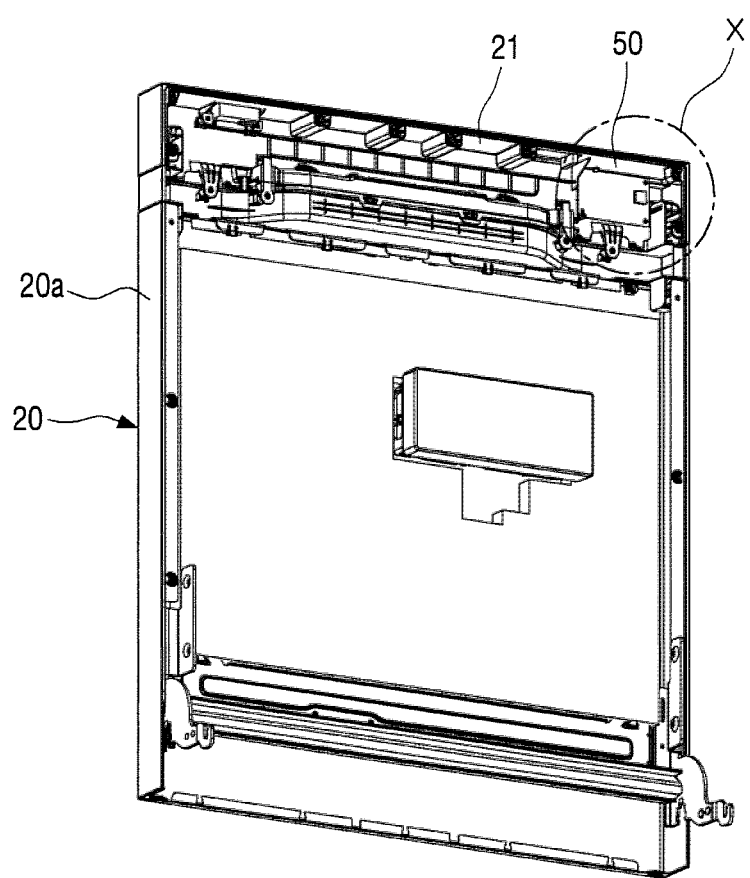
FIG. 9 illustrates a substrate fixing structure for fixing the printed circuit board disposed at an inner side of the door of the dishwasher according to various embodiments of the present disclosure.
Figure 10:
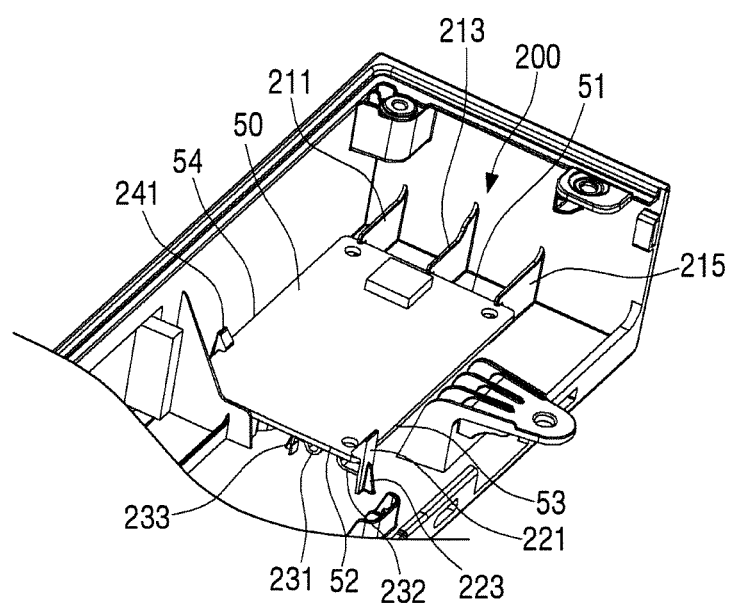
FIG. 10 illustrates a portion X illustrated in FIG. 9 according to various embodiments of the present disclosure.

Referring to FIGS. 9 and 10, the substrate fixing structure 200 firmly supports the printed circuit board 50 which is disposed at the inner side of the upper part 21 of the door 20 without using the separate fastening screw.

Figure 11:
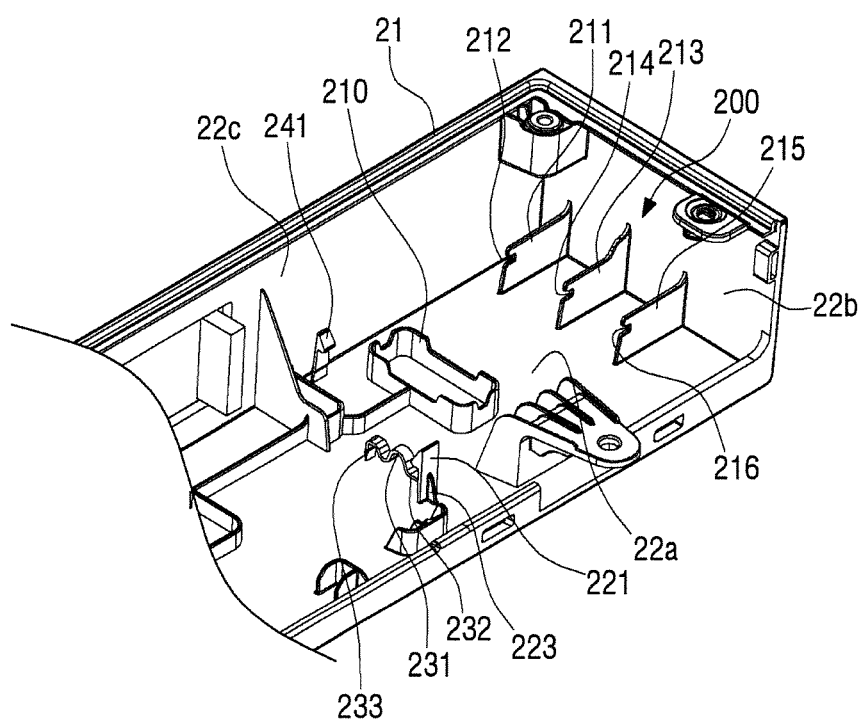
FIG. 11 illustrates the substrate fixing structure in a state in which the printed circuit board is removed according to various embodiments of the present disclosure.
Figure 12:
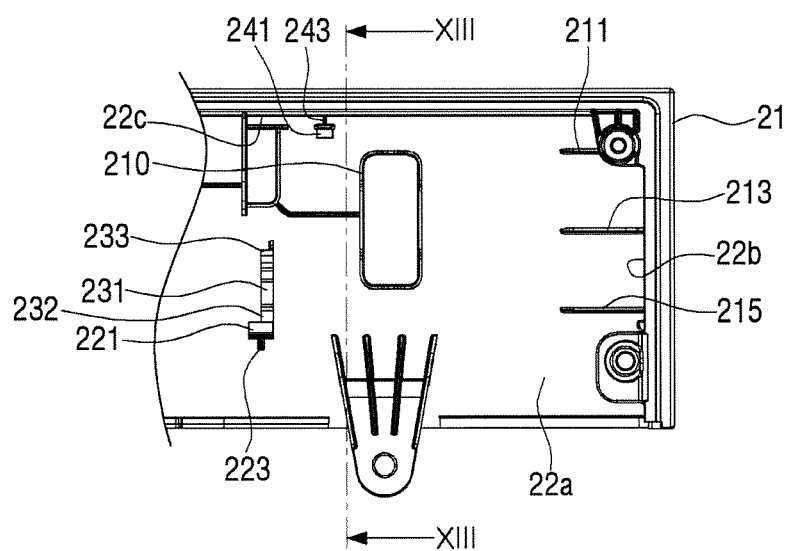
FIG. 12 illustrates the substrate fixing structure in the state in which the printed circuit board is removed according to various embodiments of the present disclosure.

Referring to FIG. 11, the substrate fixing structure 200 protrudes at the inner side of the upper part 21 of the door 20. In certain embodiments, the substrate fixing structure 200 is integrally injection-molded at the inner side of the upper part 21 of the door 20.

The substrate fixing structure 200 includes a substrate seating portion 210, a plurality of fixed ribs 211, 213, and 215, a first hook portion 221, an elastic support portion 231, and a second hook portion 241.

The substrate seating portion 210 supports a rear surface of the printed circuit board 50 when the printed circuit board 50 is fixed by the substrate fixing structure 200. A lower end of the substrate seating portion 210 is fixed to a bottom surface 22a and an upper end thereof is positioned at a predetermined height from the bottom surface 22a.

The plurality of fixed ribs 211, 213, and 215 are disposed in parallel with each other at a predetermined interval and each lower end thereof is fixed to the bottom surface 22a and each rear end thereof is fixed to a first side wall 22b. Further, as illustrated in FIG. 10, the plurality of fixed ribs 211, 213, and 215 are provided with fixed grooves 212, 214, and 216 into which a first side end 51 of the printed circuit board 50 is inserted.

The first hook portion 221 is snap-connected to the third side end 53 of the printed circuit board 50. In certain embodiments, a lower end of the first hook portion 221 is fixed to the bottom surface 22a and is supported by a reinforcing rib 223.

The elastic support portion 231 elastically supports a bottom surface of a second side end 52 corresponding to the first side end 51 of the printed circuit board 50.

Figure 13:
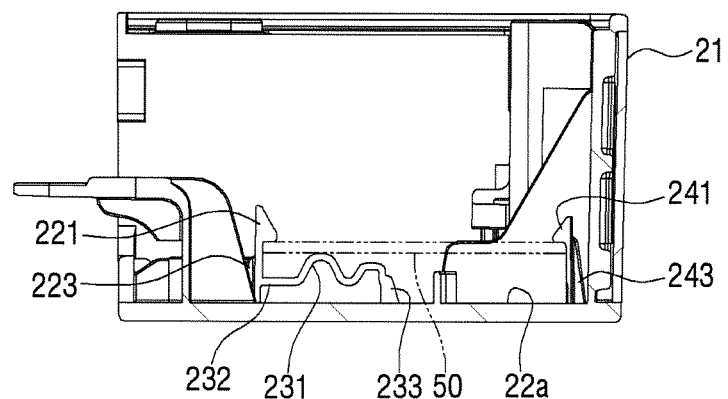
FIG. 13 illustrates a cross-sectional view of the dishwasher taken along the line XIII-XIII illustrated in FIG. 12 according to various embodiments of the present disclosure.

In certain embodiments, as illustrated in FIG. 13, the elastic support portion 231 is formed of a curved line which has a wave shape. The elastic support portion 231 preferably has a thickness enough to elastically support the printed circuit board 50 when the printed circuit board 50 is fixed by the substrate fixing structure 200.

Further, one end 232 of the elastic support portion 231 is fixed to a part of the first hook portion 221 and the other end 233 thereof is fixed to the bottom surface 22b.

The second hook portion 241 is snap-connected to a fourth side end 54 corresponding to a third side end 53 of the printed circuit board 50. In certain embodiments, a lower end of the second hook portion 241 is fixed to the bottom surface 22a and as illustrated in FIG. 13, is supported by a reinforcing rib 243.

When the printed circuit board 50 is fixed to the so configured substrate fixing structure 200, the first side end 51 of the printed circuit board 50 is first fitted in fixed grooves 212, 214, and 216 of the plurality of fixed ribs 211, 213, and 215. In this state, when the second side end 52 of the printed circuit board 50 is pressed toward the bottom surface 22a, the bottom surface of the second side end 52 of the printed circuit board 50 is elastically fixed by the elastic support portion 231 while the third and fourth side ends 53 and 54 of the printed circuit board 50 are fixed by the first and second hook portions 221 and 241.

As such, the present disclosure simply and firmly fix the printed circuit board 50 by the substrate fixing structure 200 which is integrally formed at the upper part 21 of the door 20 without using the separate fastening screw.

Meanwhile, the lower ends of the first and second hook portions 221 and 241 and the other end 233 of the elastic support portion 231, respectively, are formed to have a thin thickness to injection-mold the upper part 21 of the door 20 and then prevent a portion where the first and second hook portions 221 and 241 and the elastic support portion 231 are formed from being contracted, thereby preventing a sink mark from appearing on an outer side surface of the upper part 21 of the door 20.

The exemplary embodiment of the present disclosure describes that the substrate fixing structure 200 is integrally formed at the upper part 21 of the door 20 but is not limited thereto and therefore the substrate fixing structure 200 is formed at any one part of the door 20.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A dishwasher, comprising:
   a main body including a washing chamber and an input port for inputting dishes into the washing chamber;
   a door configured to end hinge-connect at one end to the main body and configured to open and close the washing chamber;
   a door opening apparatus installed in the main body configured to open the door,
   wherein the door opening apparatus includes:
      a thermally driven actuator with a plunger configured to protrude from the main body by thermal expansion and draw to the main body by thermal contraction,
      a movable member configured to linearly reciprocate when supplied with power from the thermally driven actuator, and
      a push portion configured to push the door so as to open the input port when supplied with power from the movable member; and
      an elastic member configured to connect between the thermally driven actuator and the movable member.

2. The dishwasher as claimed in claim 1, wherein the plunger is connected to a part of the movable member.

3. The dishwasher as claimed in claim 1, wherein the elastic member is formed of a coil spring, and
   one end of the elastic member is connected to the plunger of the thermally driven actuator and the other end thereof is connected to a part of the movable member.

4. The dishwasher as claimed in claim 1, further comprising:
   a fastener configured to separably connect to the plunger of the thermally driven actuator; and
   wherein the elastic member configured to separably connect at one end to the fastener and the other end connected to the movable member.

5. The dishwasher as claimed in claim 4, wherein the elastic member is formed of a coil spring, and
   the fastener is provided with a spiral groove with which one end of the coil spring is fastened by a screw-connection manner.

6. The dishwasher as claimed in claim 1, wherein the push portion includes:
   at least one connecting rod configured to hinge-connect to a front end of the movable member; and
   at least one push rod configured to hinge-connect to the at least one connecting rod and press the door.

7. The dishwasher as claimed in claim 6, wherein the door opening apparatus includes:
   a lower case including the thermally driven actuator, the movable member, and the push portion installed therein and configured to open an upper part; and
   an upper case configured to separably couple with the lower case to close the upper part of the lower case, and a center of the at least one connecting rod is hinge-connected to the lower case.

8. A dishwasher, comprising:

a main body including a washing chamber;

a door configured to hinge-connect to the main body and open and close the washing chamber; and a door opening apparatus installed in the main body, wherein the door opening apparatus includes:
- a thermally driven actuator including a plunger,
- a movable member configured to move forward and backward while interlocking with the thermally driven actuator, and
- a push portion configured to open the door while interlocking with the movable member,
- wherein the movable member is connected to the plunger of the thermally driven actuator by a coil spring.

9. The dishwasher as claimed in claim 8, further comprising:

a fastener that is coupled with the plunger of the thermally driven actuator, wherein the coil spring configured to have one end separably connected to the fastener and the other end connected to the movable member.

* * * * *